(12) United States Patent
Evans et al.

(10) Patent No.: US 12,392,124 B2
(45) Date of Patent: Aug. 19, 2025

(54) BRACKET MANUFACTURING METHOD (71) Applicant: Ash & Lacy Holdings Limited, West Midlands (GB)

(72) Inventors: Laura Helena Evans, West Midlands (GB); Jonathan Evans, Cambridgeshire (GB)

(73) Assignee: Ash & Lacy Holdings Limited, West Midlands (GB)

(*) Notice: Subject to any disclaimer, the term of this patent is extended or adjusted under 35 U.S.C. 154(b) by 0 days.

(21) Appl. No.: 17/914,860

(22) PCT Filed: Mar. 26, 2021

(86) PCT No.: PCT/GB2021/050749
§ 371 (c)(1),
(2) Date: Sep. 27, 2022

(87) PCT Pub. No.: WO2021/191631
PCT Pub. Date: Sep. 30, 2021

(65) Prior Publication Data
US 2023/0058224 A1 Feb. 23, 2023

(30) Foreign Application Priority Data
Mar. 27, 2020 (GB) .................... 2004542.3

(51) Int. Cl.
E04B 1/24 (2006.01)
B21C 23/14 (2006.01)
(Continued)

(52) U.S. Cl.
CPC .......... E04B 1/2403 (2013.01); B21C 23/142 (2013.01); B21D 53/36 (2013.01); E04B 2001/389 (2023.08)

(58) Field of Classification Search
CPC ............. E04B 1/2403; E04B 2001/389; B21C 23/142; B21D 53/36
See application file for complete search history.

(56) References Cited

U.S. PATENT DOCUMENTS 2,815,863 A * 12/1957 Larson ................ A47B 81/007
248/300
5,104,252 A 4/1992 Colonias et al.
(Continued)

FOREIGN PATENT DOCUMENTS

CN 105975734 A 9/2016
FR 3083291 A1 1/2020
(Continued)

OTHER PUBLICATIONS

International Search Report issued by ISA/EPO in connection with PCT/GB2021/050749 dated Sep. 30, 2021.
(Continued)

Primary Examiner — Eret C McNichols
(74) Attorney, Agent, or Firm — Levenfeld Pearlstein, LLC (57) ABSTRACT A mounting bracket (50) comprises a non-planar structure shaped by bending one or more portions of a planar body, wherein the planar body comprises before it is formed into a planar body a two-dimensionally profiled load-path approximated lower-mass structure. The planar body may be a blank stamped from material sheet or a slice separated from a profiled material block. The two-dimensionally profiled planar body may be iteratively designed using load-path analysis taking account of functional regions and preserve regions. The bracket may be used as load support for wall and roof cladding installations that require a large number of support brackets.

24 Claims, 7 Drawing Sheets (51) Int. Cl.
*B21D 53/36* (2006.01)
*E04B 1/38* (2006.01)

(56) References Cited

U.S. PATENT DOCUMENTS

| | | | | |
|---|---|---|---|---|
| 5,417,401 | A * | 5/1995 | Thompson | F24F 1/027 248/300 |
| 5,598,680 | A * | 2/1997 | Wilhelmi | E04B 1/2608 403/231 |
| 7,021,599 | B2 * | 4/2006 | DeGrazia | H01H 71/70 310/91 |
| 7,281,696 | B2 * | 10/2007 | Kida | B60J 5/06 248/300 |
| 7,658,356 | B1 * | 2/2010 | Nehls | F24S 25/613 248/237 |
| 7,997,548 | B2 * | 8/2011 | Sugiyama | B60K 20/02 248/220.21 |
| 8,011,160 | B2 * | 9/2011 | Rice | E04B 2/763 52/712 |
| 8,387,321 | B2 * | 3/2013 | diGirolamo | E04B 2/58 52/713 |
| 8,555,592 | B2 * | 10/2013 | Daudet | E04B 2/768 52/489.1 |
| 8,864,086 | B2 * | 10/2014 | Sutherland | H02G 3/32 49/58 |
| 8,870,135 | B2 * | 10/2014 | Grubbs | F16L 3/14 248/200 |
| 8,925,880 | B2 * | 1/2015 | Valembois | B29C 70/461 52/712 |
| 8,979,043 | B2 * | 3/2015 | Florman | B23P 19/00 248/248 |
| D732,708 | S * | 6/2015 | Stauffer | D25/61 |
| 9,810,369 | B2 * | 11/2017 | Lilieholm | F16M 13/022 |
| 9,938,709 | B2 * | 4/2018 | Daudet | E04B 2/767 |
| 10,411,440 | B1 * | 9/2019 | Robinson | H02B 1/06 |
| 10,590,644 | B2 * | 3/2020 | Naylor | E04B 1/2604 |
| 10,724,229 | B2 * | 7/2020 | Daudet | E04B 1/388 |
| 11,118,727 | B2 * | 9/2021 | McKechnie | F16M 13/02 |
| 2003/0020325 | A1 * | 1/2003 | Herbst | B60T 17/043 248/316.1 |
| 2004/0007652 | A1 | 1/2004 | Shaw et al. | |
| 2004/0094681 | A1 * | 5/2004 | Birnbaum | F16L 3/243 248/300 |
| 2005/0056749 | A1 * | 3/2005 | Simard | A47B 96/06 248/248 |
| 2009/0166486 | A1 | 7/2009 | Sugiyama et al. | |
| 2010/0302127 | A1 * | 12/2010 | Frank | H01Q 1/1221 248/343 |
| 2013/0240690 | A1 * | 9/2013 | Florman | F21V 21/00 29/700 |
| 2014/0190109 | A1 * | 7/2014 | Bergman | E04B 9/24 52/704 |
| 2017/0045070 | A1 * | 2/2017 | Muntasser | F16B 2/08 |
| 2017/0093140 | A1 | 3/2017 | Nikayin et al. | |
| 2018/0066425 | A1 * | 3/2018 | Ralph | E04B 1/388 |

FOREIGN PATENT DOCUMENTS

| | | |
|---|---|---|
| GB | 2381544 A | 5/2003 |
| GB | 2446959 A | 8/2008 |
| JP | H05238338 A | 9/1993 |
| JP | H07279263 A | 10/1995 |
| JP | H0921182 A | 1/1997 |
| JP | H11278064 A | 10/1999 |
| WO | 2011125732 A1 | 10/2011 |

OTHER PUBLICATIONS

Written Opinion issued by ISA/EPO in connection with PCT/GB2021/050749 dated Sep. 30, 2021.
International Preliminary Report on Patentability issued by WIPO in connection with PCT/GB2021/050749 dated Sep. 27, 2022.
Application Spotlight 3D Printed Brackets, AMFG, https://amfg.ai/2020/01/23/applications-spotlight-3d-printed-brackets, (dated Jan. 23, 2020), accessed March 1, 2023.

* cited by examiner

| | |
|---|---|
| 92 | Define a two-dimensional profile |
| 94 | Form an intermediate block incorporating the two-dimensional profile as an axial block profile |
| 96 | Axially separate one or more slices from the block |
| 98 | Transfer the slice(s) to a forming tool |
| 100 | Store remainder of the intermediate block |
| 102 | Carry out a forming operation on the slice(s) |
| 104 | Carry out finishing operation |

```
112 → Define one or more boundary conditions
        ↓
114 → Define a flat sheet volume comprising
        a defined sheet thickness
        ↓
116 → Fold sheet volume in non-flat shape   ←─┐
        ↓                                      │
118 → Define 2D sheet profile within sheet volume  ←─┐
        ↓                                             │
120 → Alter 2D profile to approximate boundary condition  ←─┤
        ↓                                                    │
122 → Fold sheet volume to approximate boundary condition  ──┘
        ↓
124 → Flatten non-flat shape to provide two-dimensional profile
        ↓
126 → Generate extrusion die and/or cutting arrangement
```

Fig. 11

(12) United States Patent
US 12,392,124 B2

BRACKET MANUFACTURING METHOD

CROSS-REFERENCE TO RELATED APPLICATION DATA

This application is a US national stage application of PCT/GB2021/050749, with an international filing date of Mar. 26, 2021, titled BRACKET MANUFACTURING METHOD, which claims the benefit of and priority to Great Britain application GB 2004542.3, filed Mar. 27, 2020, the disclosures of which are incorporated herein in their entireties.

FIELD OF THE INVENTION

The present invention relates to a method of manufacturing machine-formed articles such as brackets, particularly mounting brackets for use in the construction industry. More specifically, the present invention relates to a method for mass producing articles incorporating shape optimisation or generative design. The present invention also relates to articles manufactured by the method, and to apparatus and components used for the manufacture of such articles.

BACKGROUND

Generative design or topology/shape optimised design in manufacturing provides the opportunity of reducing the need to compromise between otherwise conflicting requirements, e.g. to improve or maintain load-bearing properties while reducing material usage.

Within literature, a distinction can be found between shape optimisation and generative design. Shape optimisation may be understood as referring to improving a material distribution within a pre-defined silhouette, whereas generative design may be understood as creating any number of solutions within a boundary condition, such as how to support a given load path. The distinction may be illustrated using an example of a four-legged table. Shape optimisation might establish how its legs may be hollowed out, before failing to withstand a threshold load. Generative design might propose a number of designs, some radically different, e.g. replacing four table legs with a single central stem supported on feet and support branches.

Such designs are typically iteratively improved and can have complex shapes incorporating higher order curves and higher order surfaces, hollow portions, irregular lattice patterns and/or cavities that are not easily attainable with conventional manufacturing methods.

Additive manufacturing (particularly 3D printing) allows complex iterative designs to be manufactured, but involves relatively high per-item production cost. In addition, dependence on many production factors makes it difficult to introduce robust quality assurance processes, meaning that it is difficult to guarantee that any two 3D-printed articles perform identically.

The present invention seeks to at least partially alleviate the aforementioned issues.

SUMMARY OF THE INVENTION

In accordance with a first aspect of the invention, there is provided a mounting bracket, comprising a non-planar structure formed from a planar body comprising a load-path approximated lower-mass structure.

The expression "mounting bracket", as used herein, refers to a component that is suitable for affixing an article via the mounting bracket to another article or surface, particular in the construction industry as well as in other fields of engineering. The mounting bracket may be a load support element suitable for affixing a load to a surface.

By a "lower-mass structure", a structure is meant that, compared to a solid volume of same outer dimensions as the structure, comprises less material. As a simplification, the expressions "network" or "lattice" may be used herein to refer to a lower-mass structure, but it should be born in mind that the lower-mass structure may be embodied by simpler shapes. For instance, compared to a single reference beam having a solid rectangular silhouette, a lower-mass structure may be constituted by a single beam that is within the rectangular silhouette of the reference beam but is bidirectionally-tapered, i.e. comprises tapering side edges providing a narrow-waist centre and wider ends.

By "load-path approximated", it is meant that the material of the mounting bracket is located in regions near or along load transfer paths between functional regions, whereas less or no material is located between functional regions, in regions not providing load transfer paths in a corresponding solid volume. The expression "approximated" will be understood as meaning that material making up the structure may not be necessarily be confined to exactly the regions of the one or more load-paths. Reasons for an approximated shape of the structure may include that any underlying load path analysis may be based on a limited number of assumptions and varying level of precision, and because the manufacturing of the planar body may require a certain amount of simplification compared to an actual load path. Likewise, the low-mass structure may be designed to be suitable for a number of planar bodies of different thickness and/or material properties.

The load-path approximated lower-mass structure is typically identifiable by a certain degree of irregularity in appearance, i.e. the structure may comprise one or more beams or struts of differing length, of varying cross-section along their lengths, of different orientation and/or spacing. Beams of different orientation may be angled at non-orthogonal angles to each other. Voids between the structures may be of complex, higher-order shapes. The structure may be 'organic' in appearance, in the shape of dendritic network, or plexus. Contributing to an organic appearance may beam structures that are tapered, i.e. comprising a cross-section that decreases with increasing distance from a functional region. In particular, beam structures between two functional load/stress reference points may be bidirectionally tapered, being widest near the reference points and tapering to a narrower waist between the reference points. A structure may be referred to as "trabecular" which herein is intended to mean an irregular network of one or more beams of any size. Despite being otherwise irregular, the lower-mass structure may comprise one or more axes of symmetry, such as bi-fold symmetry.

It is understood that load paths, as referenced herein, are load paths extending via the planar body or, once bent, via the material of the non-planar structure to which the planar body was bent to form the mounting bracket. Within the circumferential two-dimensional silhouette of the planar body before it has been formed into a non-planar shape, the mounting bracket having a lower-mass structure comprises more material along load-bearing paths, or stress-exposed paths, within the thickness of the planar body than in regions that are not load-bearing, or less stress-exposed, respectively.

The lower-mass structure may be present in the planar body and in portions formed outside the plane of the planar body. Thereby, the lower-mass structure may extend across the connections of two or more planes of the non-planar structure, e.g. an aperture, a tapered beam portion and/or lattice structures may extend across a bend of the non-planar structure.

In some variants, the mounting bracket may be characterised as comprising a plurality of functional regions for mounting an article to be provided via the mounting bracket to a surface to be provided (wherein the surface may be a surface of another article), wherein the mounting bracket comprises a non-planar structure shaped by a forming operation applied to one or more portions of a planar body, wherein the planar body permits a load transfer between the functional regions through one or more load paths through the planar body, and wherein the mounting bracket comprises, compared to a solid volume of the same outer dimensions as the mounting bracket, less material within the planar body in regions that are not load-exposed.

In some embodiments, the load-path approximated lower-mass structure constitutes a body profile extending perpendicularly to a plane of the planar body.

The planar body is understood to have a two-dimensional extension (length and width) and a body thickness. For instance, the planar body may be a blank stamped from material sheet having a sheet thickness, or a slice separated from a material block, the slice having a slice thickness.

Although the planar body may comprise manufacturing features, such as edge burr, depending on the manner of manufacturing the planar body, a body profile that extends for practical purposes constantly across the thickness of the planar body, i.e. perpendicularly to the plane of the planar body, allows the lower-mass structure to be manufactured by axial forming methods. For instance, the lower-mass structure may be stamped from a sheet to obtain the planar body, or it may be extruded, before the planar body is cut from the extrudate, to be shaped to form the mounting bracket.

In some embodiments, one or more of the portions bent from the planar body comprise one or more functional regions.

Herein, the expression "functional region" denotes a region of the mounting bracket that is used to connect an article or surface with the mounting bracket. Functional regions may comprise holes or recesses. Holes of a functional region are typically designed for connection purposes rather than weight-reduction. E.g., screw holes or screw slots, having circular or oblong shape, may be provided at the ends of a mounting bracket. A functional region may comprise a retainer structure such as a tab, clip or hook to engage another suitable shaped structure of another article. The functional regions may constitute reference points for the analysis of load paths or stress distribution.

In some embodiments, one or more of the portions bent from the planar body are offset along the planar body to provide a clip.

In particular, the portions extending along the planar body may be used as so-called helping-hand clips. These are clip structures that may be provided on a mounting bracket, permitting a provisional retention of an article to be mounted to the bracket, and permitting the article to be slid laterally relative to the clip before the article is permanently connected with the bracket using bolts.

In some embodiments, a cross-section of one or more portions of the planar body has been plastically deformed within its planar extension.

The plastic deformation within the planar extension of the planar body may comprise a thinning of one or more beams or struts of the lower-mass structure in one dimension and a corresponding lengthening or widening of the beams in another dimension. This allows more complex shapes to be obtained.

In some embodiments, the non-planar body is a unitary body. In some embodiments, the lower-mass structure extends across multiple planes of the non-planar body. For instance, apertures of the lower-mass structure, such as re-entrant apertures and/or fully enclosed apertures, may extend across a bend of the non-planar body.

In some embodiments, the mounting bracket is formed from metal. The article may be formed from a material comprising steel, a steel alloy, aluminium, and/or an aluminium alloy.

In some embodiments, at least one beam of the lower-mass structure comprises a tapering profile portion.

The profile can be understood as tapering laterally along the plane of the planar body, the planar thickness remaining constant. A beam may comprise a beam cross-section that tapers with increasing distance from a functional region. A beam connecting two functional regions may be bidirectionally tapering. The taper may be curved.

In some embodiments, the lower-mass structure comprises one or more beams of varying cross-section along their lengths.

In some embodiments, the lower-mass structure comprises struts at non-orthogonal angles to each other.

The struts, or beams, are understood to extend in the plane of the planar body. The struts may enclose one or more apertures or voids within the planar body. The struts, or beams, may constitute cross-links between other beams extending between functional regions. The cross-links may be connected to other beams/struts at non-orthogonal angles.

In accordance with a second aspect of the invention, there is provided a method, of manufacturing an article. The method comprises the steps of: defining a two-dimensional profile comprising a load-path approximated lower-mass structure, providing a planar body incorporating the two-dimensional profile as a body profile, and carrying out a forming operation on the planar body to form a non-planar structure by bending one or more portions out of a plane of the planar body.

The load-path approximated lower-mass structure is identifiable by the presence one or more recesses along the circumference of the planar body, and/or by the presence of one or more openings within the planar body. As described in relation to the first aspect, the structure may comprise beams or struts of differing length, of varying cross-section along their lengths, of different orientation and/or spacing. Openings constituted by voids between the structures may be of complex, higher-order shapes.

In some embodiments, the method comprises providing a sheet of material to provide the planar body, and separating material from the sheet to thereby incorporate the two-dimensional profile as a body profile.

The sheet of material may be provided as metal sheet, in the form of blanks or rolled from a reel. Even though the sheet material may exhibit a degree of flexibility, it will be understood that the planar body separated from the sheet can be presented in practically flat form for processing.

The step of separating material from the sheet may be carried out by stamping the two-dimensional profile from the sheet. The step of separating the material from the sheet may be carried out by cutting, such as laser-cutting.

In some embodiments, the method comprises forming an intermediate block incorporating the two-dimensional profile as an axial block profile, and axially separating one or more slices from the intermediate block to provide the planar body.

In some embodiments, forming an intermediate block incorporating the two-dimensional profile comprises extrusion or pultrusion.

It will be understood that an axial profile of a given block is a profile that is, for practical purposes, constant in shape along most, or the entire length, of the block. An axial profile may render the block suitable for manufacturing processes such as extrusion or pultrusion.

A planar body is in that case understood to be a slice oriented in a plane perpendicular, or predominantly perpendicular, to the block axis. The slice incorporates a two-dimensional slice profile corresponding to the axial block profile. Depending on the method used to obtain the slice, the slice may comprise slicing features or cutting features such as burr. Herein, for ease of reference, the expression "slice axis" is used to identify the slice direction corresponding to the block axis, even though the slice may be considerably thinner (shorter) than the block.

The forming operation allows re-shaping the planar body in a direction other than its planar extension, for instance by bending a portion of the planar body towards the slice axis, and/or by plastically deforming one or more portions of the planar body to alter its cross-section.

The forming operation may be carried out during the step of separating one or more planar bodies from the block. The forming operation may be carried out after the step of separating one or more planar bodies from the block. The step of separating a planar body may be followed by a step of transferring the planar body to a forming apparatus. The step of separating may be followed by a step of transferring a remainder of the block into storage.

In some embodiments the separation step may be preceded by an alignment step, to align a cutting implement relative to the block, to ensure the slice to be separated from the block has a pre-defined thickness within set tolerance levels.

In some embodiments, forming an intermediate block incorporating the two-dimensional profile comprises cutting a two-dimensional profile into the block.

It will be understood that a method used to incorporate a two-dimensional profile into the block involves creating the two-dimensional profile along the block axis, to provide a practically constant shape along the block axis.

Cutting may involve cutting using laser, water, or other suitable operations. A cutting step may be carried out after an extrusion or pultrusion step.

In some embodiments, separating one or more slices from the intermediate block comprises cutting the block.

In some embodiments, the method comprises a step of smoothing a surface of the planar body.

Smoothing a surface of planar body may comprise shaving, deburring, or otherwise removing excess edge material. A smoothing step may be carried out before and/or after separating a planar body from an intermediate block, for instance on a free end before cutting and on the cutting surface thereafter. A smoothing step may be carried out before, during, and/or after the forming operation.

An article manufactured according to the method disclosed herein may be characterised by burr features and/or smoothing features at edges consistent with a cutting process, slicing process and/or smoothing process carried out perpendicular to an extrusion axis.

The smoothing may be carried out on one or both faces of the slice. The smoothing may be carried out on one or more edges of the slice.

In some embodiments, the forming operation comprises bending and/or die-forming.

In some embodiments, the forming operation comprises plastically deforming one or more portions of the planar body within its planar extension to alter a cross-section of one or more portions of the planar body within their planar extension.

Plastically deforming to alter a cross-section of one or more portions of the planar body may involve thinning and/or widening the planar body or part of it in relation to its thickness. Plastically deforming may involve stretching and/or compressing the planar body or part of it in relation to its planar extension.

In some embodiments of the first aspect or of the second aspect, the two-dimensional profile is designed by way of topology optimisation, shape optimisation, or a generative design process. The expression "optimisation" will be understood in the context of approximating a reduced weight structure. In particular, the load-path approximated lower-mass structure may be the result of a load path analysis combined with topology optimisation and/or a generative design process.

As set out above, the two-dimensional profile may as such be characterised by the presence of irregular structures, higher order curves and higher order surfaces, hollow portions, and irregular two-dimensional lattice structures. As a consequence of the irregularity, there may be along the profile height no, or only few, sections of the two-dimensional profile perpendicular to the height extension that are identical to other sections of the two-dimensional profile. The two-dimensional profile may be trabecular in character. The two-dimensional profile may have an organic appearance. For instance, the two-dimensional profile may comprise beams tapering from functional regions, or bidirectionally tapering between functional regions.

In some embodiments the method comprises incorporating as functional regions in the two-dimensional profile one or more screw holes, screw slots and/or clips.

The method in accordance with the second aspect may be used to form a mounting bracket comprising screw holes and/or screw slots, for example to form a load-support bracket, used to mount an article to a surface.

In some embodiments there is provided an article formed according to the second aspect of the invention. Any one or more of the features described in relation to the first aspect may be combined with, or incorporated into, embodiments of the second aspect. In one embodiment, the article is formed of a unitary piece of material, in particular of a unitary piece of metal.

The article is expected to exhibit manufacturing elements indicative of an axial manufacturing, such as an axially constant profile across the thickness of the article.

The article is expected to lack features usually associated with other manufacturing methods. The article will not usually have a stepped surface associated with layer-on-layer manufacturing known from 3D printing. The article will not usually comprise a parting line or sprue features associated with moulding or casting. The article may be characterised by the absence of de-moulding design features such as de-moulding surface tapers.

In accordance with a third aspect of the invention, there is provided a method of defining a two-dimensional profile. The method is provided to define a profile for forming a mounting bracket according to any one of the embodiments of the first aspect or a method according to any one of the embodiments of the second aspect. The method comprises: defining a design space comprising one or more boundary conditions, defining a sheet volume having a sheet thickness and one or more functional regions, forming, within the design space, the sheet volume into a non-flat shape by bending portions of the sheet volume, defining a two-dimensional sheet profile within the sheet volume based on the boundary conditions and the one or more functional regions, and flattening the non-flat shape to a planar sheet, to provide a two-dimensional profile that is constant over the sheet thickness.

The profile to be defined within the two-dimensional sheet volume may be created using an iterative design process. The profile to be defined within the two-dimensional sheet volume may be created by a generative design process, topology optimisation and/or shape optimisation.

It will usually be expected that the profile comprises unitary and interconnected structures so as to be suitable for manufacturing a single-component planar body, for instance by stamping or by extrusion.

As described in relation to the previous aspects, a two-dimensional profile incorporating a load-path approximated lower-mass structure is identifiable by the presence of one or more curved recesses along the circumference of the planar body, and/or by the presence of openings within the planar body. The structure may comprise beams or struts of differing length, of varying cross-section along their lengths, of different orientation and/or spacing, in particular tapering and bidirectionally tapering beams.

Voids between the structures may be of complex, higher-order shapes.

The two-dimensional profile may comprise several apertures, no less than 3, 4, 5, 6, 7 or 8 of apertures. The two-dimensional profile may, in an extension perpendicular to its two-dimensional plane, comprise less than 40%, less than 30%, less than 20%, or less than 10% of a repeating profile section. The profile may, in an extension perpendicular to its two-dimensional plane, contain no, or practically no repeating profile section.

In some embodiments, the method comprises a step of altering the two-dimensional sheet profile.

The two-dimensional sheet profile may be altered to approximate the one or more boundary conditions.

In some embodiments, the method comprises a step of further forming the non-flat shape.

In order to arrive at an improved shape, the two-dimensional profile may be iteratively modified to approximate a boundary condition, for instance to achieve a required load-bearing capacity. For instance, the two-dimensional profile may be modified to remove material from low-stress regions. The low stress regions may be established by computational means such as load path analysis. To provide further examples, the non-planar shape may be re-shaped by altering the planar circumference, e.g. by allowing a bracket stem or head to be widened and/or lengthened, and/or by altering the manner in which the non-planar structure is implemented, e.g. by transforming a single 90 degree bend into multiple angular bends amounting to 90 degrees, e.g. two 45 degree bends, or two 15 degree bends plus one 60 degree bend.

In some embodiments, forming the sheet volume into a non-flat shape comprises plastically deforming by bending, folding, die-forming and/or beading. In some embodiments, forming the sheet volume may comprise plastically deforming a cross-section of one or more portions of the sheet volume within its planar extension.

Plastically deforming a cross-section may involve thinning and/or thickening the slice or part of it in relation to its thickness. Plastically deforming may involve stretching and/or compressing the slice or part of it in relation to its planar extension.

It will be understood that the shaping and forming operations may be carried out computationally. Re-shaping the two-dimensional sheet volume computationally may involve limiting the re-shaping operations on the two-dimensional sheet volume to such operations that can be reproduced when re-shaping a work piece. For instance, the two-dimensional sheet volume may be bent only using curvature angles and radii that can be reproduced when bending a sheet metal plate of a thickness defined as the sheet thickness.

The step of flattening the non-flat shape to a two-dimensional profile may comprise reversing the forming operations of the non-flat shape. It will be understood that the flattening step may be carried out computationally, to obtain a two-dimensional profile for use with embodiments of the first aspect or embodiments of the second aspect.

In some embodiments, defining a two-dimensional profile comprises incorporating functional regions such as one or more screw holes, screw slots, tabs, hooks, and/or clips.

In some embodiments, the method comprises defining an extrusion arrangement for manufacturing a block incorporating the two-dimensional profile as an axial block profile.

In some embodiments, the method comprises defining a set of instructions for controlling a cutting arrangement for manufacturing a planar body incorporating the two-dimensional profile.

In accordance with a fourth aspect of the invention, there is provided an extrusion arrangement, designed according to any one of the embodiments of the third aspect.

For instance, the extrusion arrangement may be constituted by an extrusion die.

In accordance with a fifth aspect of the invention, there is provided a cutting arrangement, comprising a set of instructions according to any one of the embodiments of the third aspect.

The instructions may be provided in the form of software instructions. The cutting arrangement may comprise a processor and the software instructions implemented by the processor.

Any features described in relation to embodiments of the different aspects may be combined with features of embodiments and/or incorporated with embodiments of each one of the other aspects. For example, methods of defining a two-dimensional profile according to the third aspect may be combined with methods of manufacturing an article according to the second aspect.

The methods described herein in relation to the second and subsequent aspects are intended particular for use in the manufacture of a mounting bracket described in relation to embodiments of the first aspect. The methods described in relation to the second and subsequent aspects may be used in the manufacture of other articles such as non-load bearing articles.

DESCRIPTION OF THE FIGURES

Exemplary embodiments of the invention will now be described with reference to the Figures, in which.

DESCRIPTION

Figure 1:
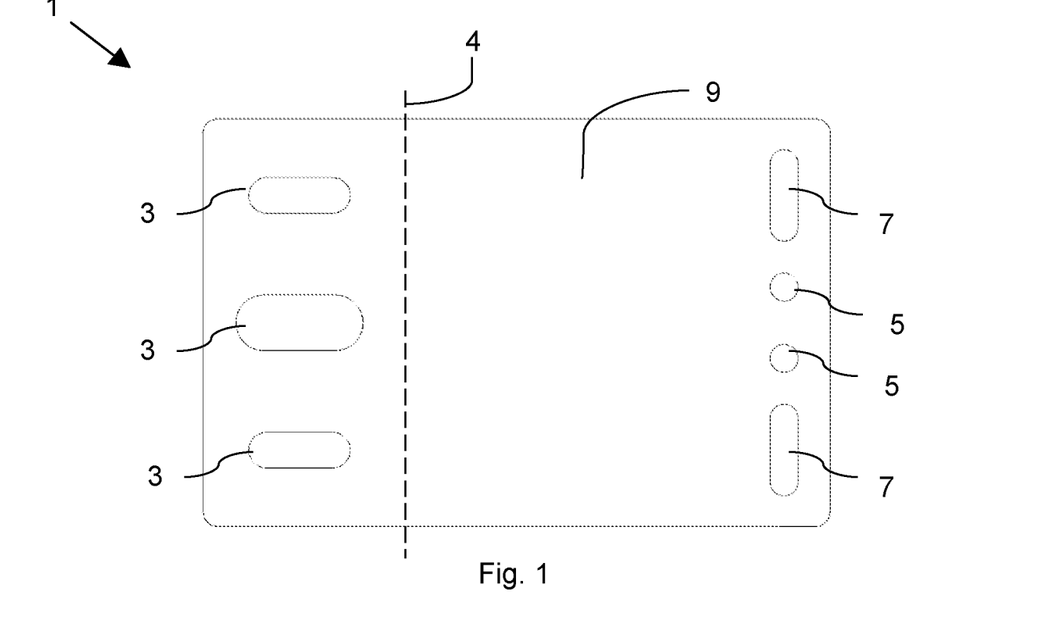
FIG. 1 shows a plan view of a two-dimensional blank to be formed to a load-bearing bracket.

FIG. 1 shows a top view of a planar blank 1 from which a shaped bracket may be formed by bending one or more portions of the blank 1 out of the plane of the blank. The blank 1 may have been obtained by stamping the shape from a sheet metal reel. The blank 1 is of rectangular layout and comprises a first functional region comprising three fixation slots 3 and a second functional region comprising two round fixation holes 5 and two elongate fixation slots 7. The main body 9 is constituted by the sheet material, such as aluminium or steel. The main body may, for instance, be formed to a bracket by bending it along a bend line 4 extending vertically (vertically in the reading orientation of FIG. 1) between the first functional region and the second functional region, to provide an L-shaped, angled bracket.

Figure 2:
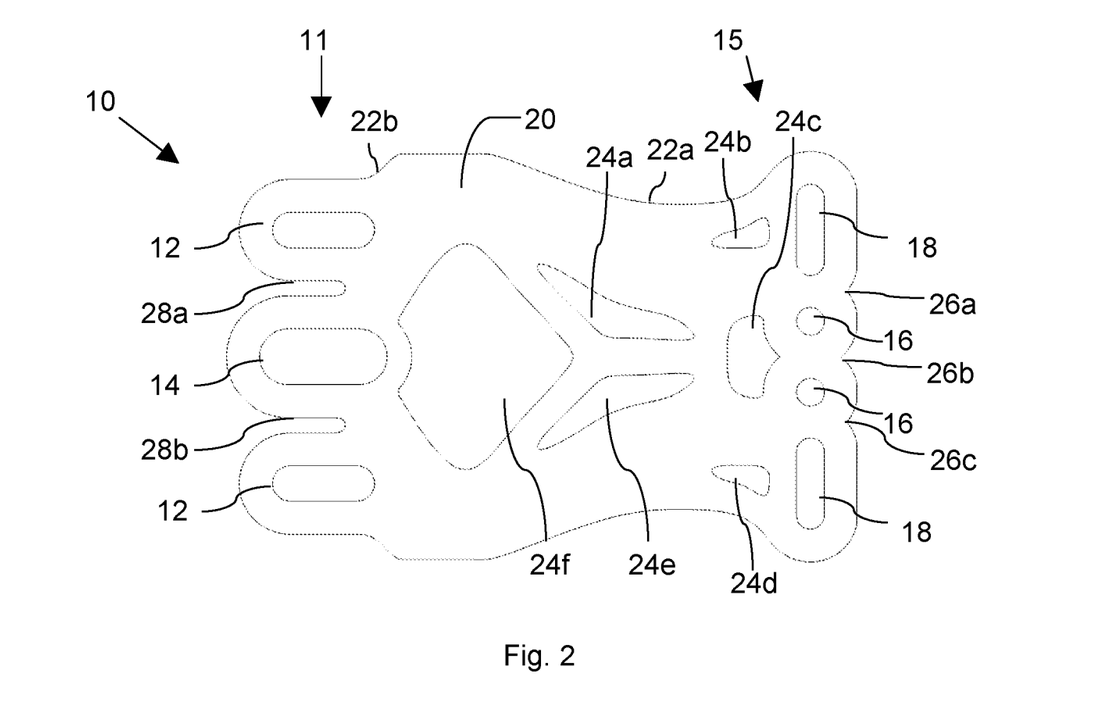
FIG. 2 shows a plan view of planar body incorporating a two-dimensional profile in accordance with an illustrative embodiment.

FIG. 2 shows a top view of a profile 10 constituting a lower-mass profile in accordance with an embodiment. As illustrated herein, the profile 10 has outer dimensions (length, width and thickness) that are comparable to that of the planar blank 1, i.e., that fit within a generally rectangular silhouette similar to that of blank 1.

The profile 10 comprises a first functional region 11 at one end, which may become a head end of a bracket, and a second functional region 15, which may become a foot end of a bracket, at an end opposite the first function region. The functional regions in FIG. 2 correspond to those of FIG. 1. The first functional region 11 of the profile 10 is constituted by two narrow elongate fixation slots 12 flanking a wide elongate fixation slot 14. The second functional region 15 of the lower-mass profile 10 comprises two fixation holes 16 and two fixation slots 18. The slots 12, 14, 18 and the holes 16 constitute functional regions and are part of a unitary body 20.

The profile 10 constitutes a lower-mass profile, because, compared to a rectangular blank (such as shown in FIG. 1), several portions of the profile 10 have been removed. The remaining portions making up a continuous network of beams constitute the unitary body 20. The shape of the unitary body 20 may be based on a load path analysis between the functional regions 11 and 15. In particular, material has been removed from the edges, at a waist edge 22a and at a neck edge 22b, and from within the body at apertures 24a, 24b, 24c, 24d, 24e and 24f, from low-stress regions near the first functional region 11 in the form of slots 28a and 28b and from low-stress regions near the second functional region 15 in the form of notches 26a, 26b and 26c. Apart from a two-fold symmetry exhibited by the profile 10 (the symmetry line extending horizontally in the reading orientation of FIG. 2), the shape of the apertures 24a-f is irregular. The shape of the edges 22a, 22b and the apertures 24a-f is defined by higher-order polynomials. The apertures 24a-f are enclosed, within the plane of the unitary body 20, by beams or struts providing cross-links of beam portions extending between the functional regions 11 and 15, and oriented at non-orthogonal angles. The edges of the profile 10 comprise several higher degree curves and hollow portions. Likewise, the beams between the functional regions are of different length, of varying width along their length, and the beams have different orientations relative to each other, including beams or struts at non-orthogonal angles to each other. While the profile 10 comprises several apertures 24a-f, the lower-mass profile may be provided by recesses obtained by omitting material from edges, for instance to provide a bone shape or X-shape.

The profile 10 may be stamped from a metal sheet which is provided from a reel. The profile 10 may be made from steel.

Figure 3:
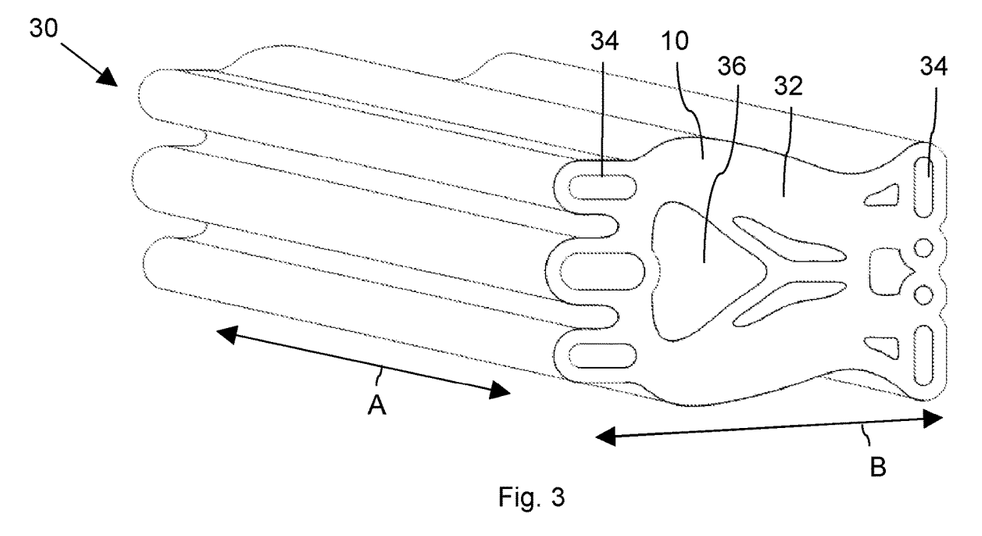
FIG. 3 shows a perspective view illustrating an exemplary intermediate component for the manufacture of an illustrative embodiment.

FIG. 3 shows an isometric view of an extruded block 30 comprising the profile 10 as an extrusion profile. In FIGS. 2 to 8, the same numerals are used for equivalent elements without repeating the description thereof. The extruded block 30 constitutes an intermediate component for the manufacture of an article. The extruded block 30 comprises a main axis illustrated by an arrow A, corresponding to an extrusion axis. For practical purposes the extrusion profile is constant along the extrusion axis. The extruded block 30 has a height illustrated by an arrow B that extends in a plane perpendicular to the main axis.

Consistent with the FIG. 2 profile, the extruded block 30 comprises a main material block 32 and hollow channels 34, 36. Some of the hollow channels 34 are geometrically simple, such as circles or oblong shapes that correspond to the functional regions 11, 15 shown in FIG. 2. Their planar shape and layout may be identical to that of the slots 3, 7 and hols 5 of the blank 1. Others of the hollow channels 36 are more complex and correspond to the apertures and edge shapes 22 to 28 shown in FIG. 2. Due to the irregular nature of the lower-mass structure there is a large variation in the cross-sectional structure perpendicular to the block height (i.e., along the dimension indicated by arrow B). The cross-section of the beams extending from the hollow channels 34 (the channels 34 constituting functional regions), decreases with increasing distance from the hollow channels 34. It can be seen that some of the beams are tapering with increasing distance from functional regions, and some beams are bidirectionally tapered having a narrow cross-section between the functional regions.

Although described as an extruded block 30, it will be understood that the block 30 may be manufactured by any method permitting elongate complex shapes to be made, such as pultrusion, laser cutting, water cutting or other appropriate methods.

In order to obtain a planar body similar to the illustration of FIG. 2, one or more slices may be separated from the extruded block 30, for instance by cutting, or by any other suitable operation. The extrusion is considered herein to be suitable particularly for aluminium alloys. Other materials may be used.

By slicing the extruded block 30 perpendicular to its main axis A, a large number of flat plates of similar, and practically identical, slices may be manufactured. Each one of such slices constitutes a planar body that may be subjected to further forming operations.

Figure 4:
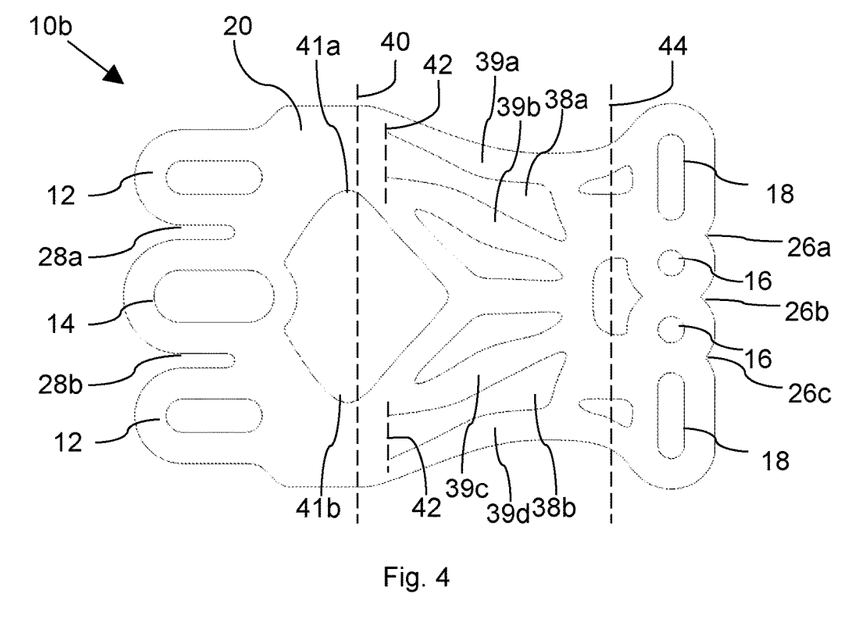
FIG. 4 shows a plan view of a planar body manufactured from a slice of the FIG. 2 intermediate component.

FIG. 4 shows a profile 10b that is similar to the design of the profile 10 of FIG. 2.

The profile 10b comprises two tabs 38a, 38b each located within a material beam of the unitary body 20. The two tabs 38a, 38b may be pressed into the profile 10 and extend outside and along the plane of the profile 10. In the particular embodiment, the two tabs 38a, 38b are to be formed to provide a so-called helping-hand clip arrangement as illustrated in FIGS. 5 to 8. The tabs 38a, 38b are generally elongate and comprise a narrower waist such that beam material immediately adjacent the tabs 38a, 38b comprises wider portions 39a, 39b (laterally of tab 38a) and 39c, 39d (laterally of tab 38b). The wider portions 39a-39d have the same planar thickness as the remainder of the unitary body 20.

Indicated in the profile 10b of FIG. 4 are fold lines 40, 42 and 44. The fold lines 40, 42, 44 may not be visible in an actual planar body. The fold lines 40, 42, 44 are illustrated herein as extending across the width, or part of the width, of the planar body 10 to facilitate the understanding of FIGS. 5 to 8. A first fold line 40 extends through an arrowhead-shaped cavity (see aperture 24f in FIG. 2) comprising two neck portions 41a, 41b at which the beam width is reduced. Two second fold lines 42 extend, one each, at the base of the tabs 38a, 38b. A third fold line 44 extends near the second functional region through three apertures.

Figure 5:
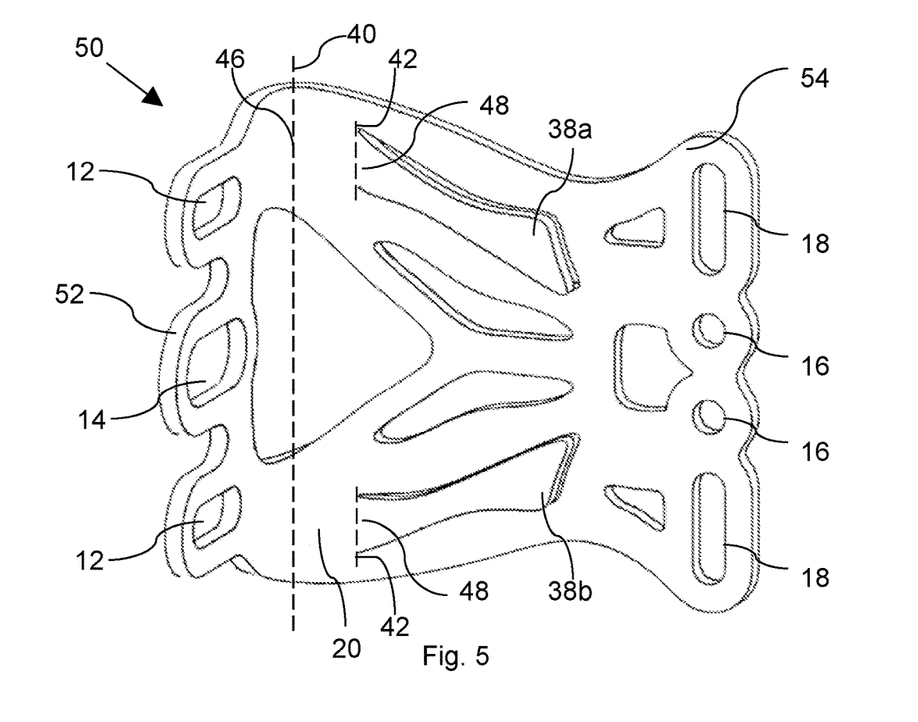
FIG. 5 shows an isometric view of an embodiment manufactured from a slice of the intermediate component of FIG. 3.
Figure 6:
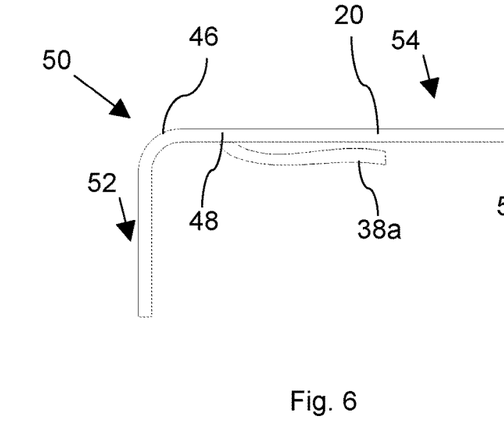
FIG. 6 shows a side view of the FIG. 5 embodiment.

FIGS. 5 and 6 show an isometric view and a side view, respectively, of a bracket 50 formed from a unitary body 20, such as the planar body 10b of FIG. 4. The bracket 50 constitutes a mounting bracket and may be used as a load-bearing element. The bracket 50 has been bent along the fold line 40 to provide a first bend 46 that is at a right angle to provide an angled "L" shaped bracket (see side view in FIG. 6 showing an L-shaped bracket). The tabs 38a, 38b have been bent at a bend 48 out of the plane of the planar body 10b along the fold line 42 to provide helping-hand clips (see FIG. 6 showing the clip 38a extending along, but outside the plane of, the unitary body 20).

The bend 46 separates a head portion 52 of the bracket 50 from a stem portion 54 or foot portion. Both the head portion 52 and the stem portion 54 comprise a lower-mass structure. One of the apertures (aperture 24f, annotated in FIG. 2) extends across the bend 46 such that the lower-mass lattice extends over several (here: two) planes of the non-planar bracket 50. In the example shown herein, a single bend 46 along a bend line 40 is provided to obtain a 90-degree included angle such that the head portion 52 is at a right angle to the stem portion 54. However, any other angle arrangement may be used, for instance, depending on the material and/or thickness of the planar body it may be more appropriate to provide two adjacent bends each having an about 45 degrees included angle that together amount to a 90-degrees bend to provide a right-angled stem portion. By way of the bend, the head portion 52 extends in a plane other than the planar extension of the planar body 10b (for instance, along the slice axis or the original extrusion axis of the intermediate body 30). Any number of portions of the planar body 10b may be shaped, folded, beaded, etc. in this manner.

The bracket 50 does not comprise a bend along the bend line 44 illustrated in FIG. 4. This is because the planar body 10b may be used as precursor for a number of differently shaped brackets.

Figure 7:
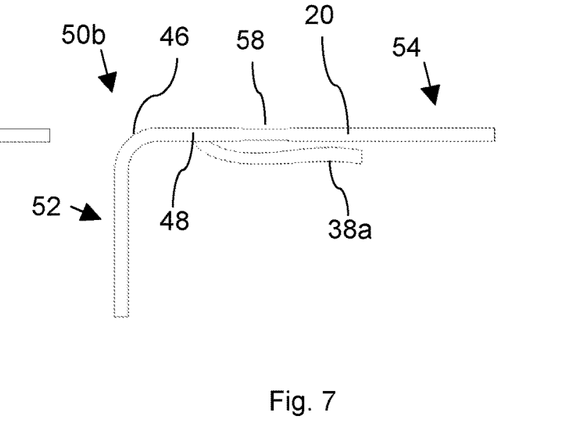
FIG. 7 shows a side view of a variant of the FIG. 5 embodiment.

FIG. 7 shows a side view of a bracket 50b that is a variant of the bracket 50 of FIG. 6, constituting another mounting bracket. The bracket 50b corresponds to the bracket 50 and so the same numerals are used for similar elements without repeating the description thereof. The bracket 50b may be formed from the same shaped planar body 10b as the bracket 50. However, in addition to what is shown in FIG. 6, the FIG. 7 bracket 50b comprises a portion 58 the cross-section of which has been plastically deformed, within the plane of the planar body 10b, to reduce the cross-section thickness and stretch the stem portion 54 in length. The portion 58 corresponds to the location of the regions 39a-39d illustrated in FIG. 4.

Figure 8:
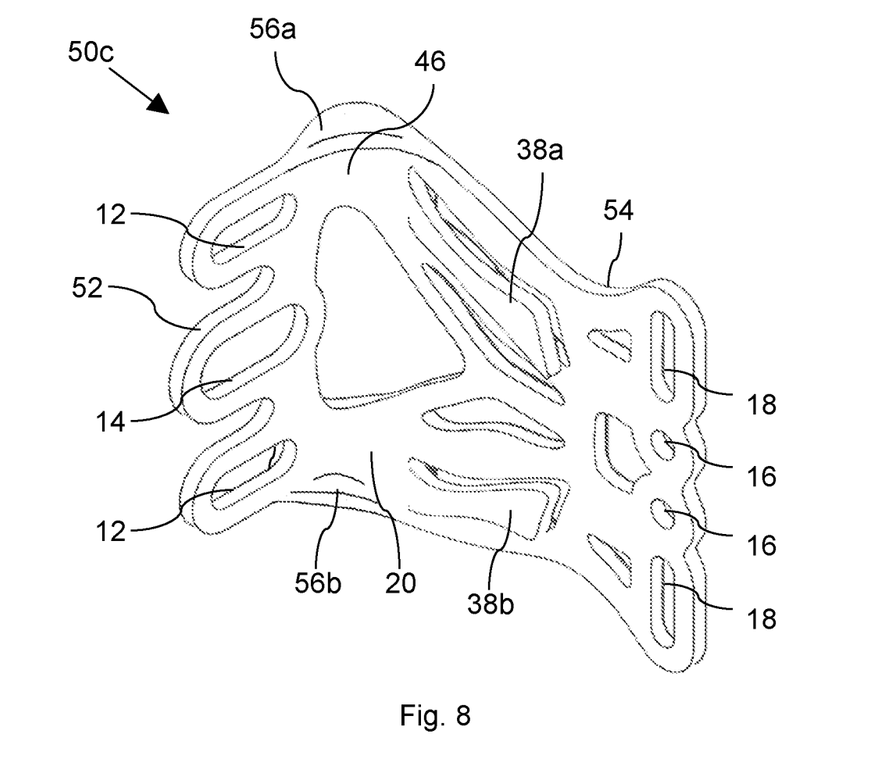
FIG. 8 shows an isometric view of another variant of the FIG. 5 embodiment.

FIG. 8 shows an isometric view of a bracket 50c that constitutes another variant of the bracket 50, constituting another mounting bracket. The bracket 50c corresponds to the brackets 50 and 50b, and comprises a head portion 52 with a first functional region comprising fixation slots 12, 14 and a stem portion 54 with a second functional region comprising fixation holes 16 and fixation slots 18. Two helping-hand clips 38a, 38b are bent from the unitary body 20. In addition, two reinforcing ribs 56a, 56b have been formed in corners of the right-angled bend 46.

FIG. 8 illustrates a bracket of relatively complex form, compared to an angle bracket formed from a plain rectangular blank, having a lower-mass structure comprising several irregular shapes. The shapes of the structures are a consequence of a mass-reducing analysis allowing the overall weight of the bracket to be reduced. Underlying the present invention is an appreciation that the reduced-mass profile can be provided in two-dimensional form, permitting it to be incorporated into a planar body suitable e.g. for stamping and/or extrusion, before shaping the planar body into a non-planar article. The planar body can be mass manufactured, and shaped to a non-planar (three-dimensional) article, at relatively lower cost than is presently possible using additive manufacturing or casting methods.

Although a single head portion 52 is depicted in FIGS. 5 to 8, it will be understood that more complex shaping may be used to form the bracket, including wings, corrugations, ribs, beads, etc, including features such as fingers or wings that can be bent to provide bracket clips, hooks, and/or spring arms, such as the exemplary helping-hand clips 38a, 38b.

The profile of the planar body 10 is believed to provide improved (slower) thermal transmission properties when formed into a bracket such as bracket 50, 50b or 50c, because the material paths between the functional regions of the head portion 52 and the stem portion 54 are curved and meandering, thereby increasing the length of a heat transfer path. Any one or more, or all, of the beams connecting the functional regions may be designed in a way that reduces the heat transfer properties, by incorporating curves, serpentine structures, thinner cross-sections and/or corrugations.

Figure 9:
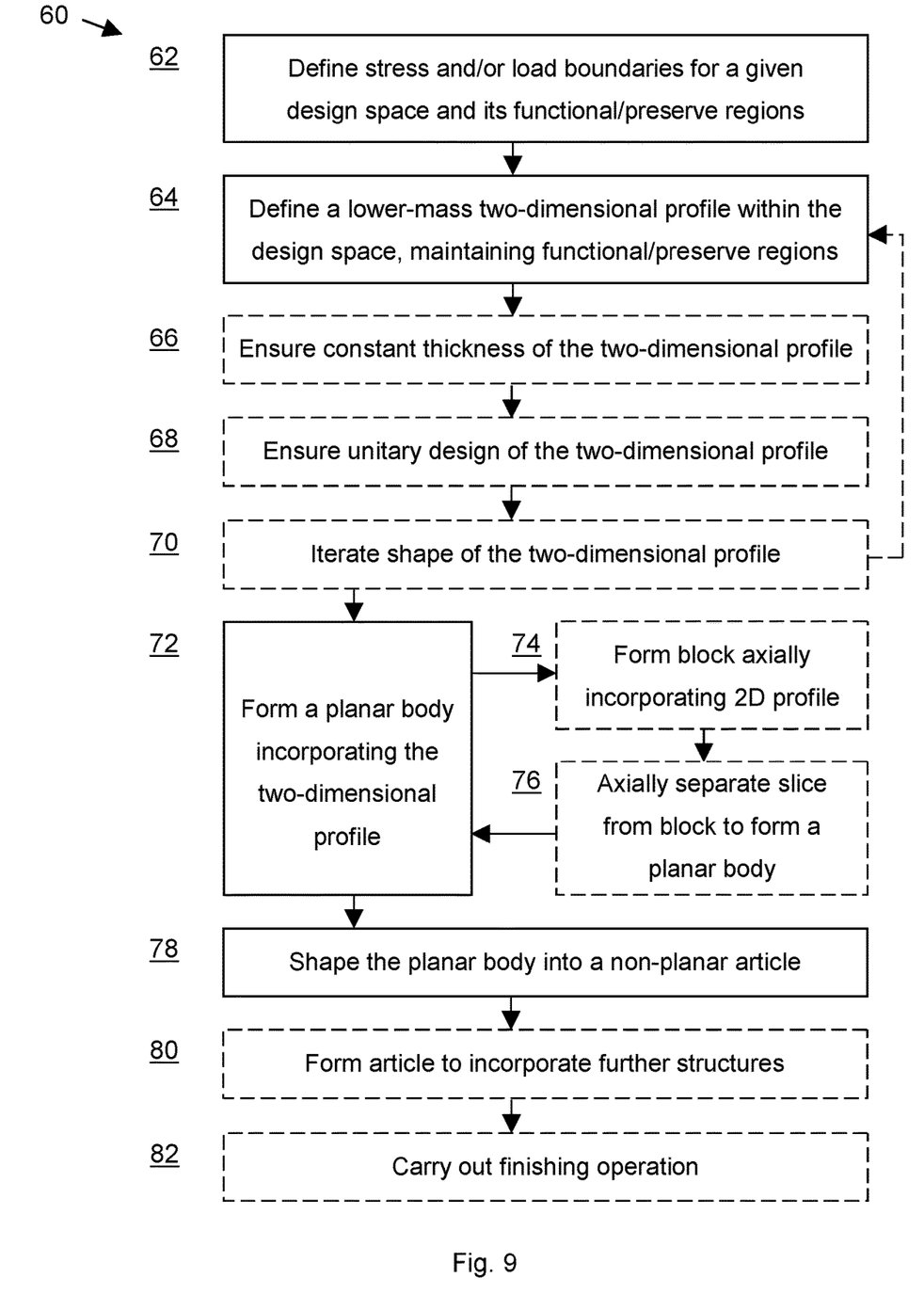
FIG. 9 shows a sequence of steps in accordance with an exemplary embodiment.

FIG. 9 describes an exemplary method 60 of manufacturing a component such as a bracket 50c of FIG. 8. The method 60 comprises a step 62 of defining stress and/or load boundaries within a design space for an article formed from a planar sheet, such as a mounting bracket. The design space can be understood as the volume taken up by an otherwise solid reference article including functional regions such as mounting slots. The design space may further include preserve regions such as areas of material required to form clips or ribs. For instance, the design space may be constituted by a shape such as the planar blank 1 of FIG. 1, comprising as functional regions the fixation slots 3, 7 and the fixations holes 5.

In step 64, a two-dimensional profile is defined that has lower mass than a solid sheet within the same design space, after consideration of functional regions and preserve regions. The process of defining a two-dimensional profile practically removes material where analysis suggests it is not needed. The aim of step 64 is to provide a two-dimensional profile suitable for axial manufacturing, such as stamping from a sheet or extruding. For instance, the lower-mass two-dimensional profile may be constituted by a shape such as the profile 10 of FIG. 2, comprising a lower-mass structure between the functional regions, and having maintained the functional regions in the form of the slots 12, 14, 18 and the holes 16.

By "functional regions" and "preserve region", regions of the article are meant that are not allowed to be changed as part of the iteration process. For instance, the bracket may have to fulfil certain requirements that are considered boundary conditions, for instance to include a certain arrangement of screw holes and a pre-defined minimum and/or maximum width, height, weight and sheet thickness. In step 64, a two-dimensional sheet profile is defined that meets the boundary conditions. The material distribution within the two-dimensional sheet profile may be following load paths determined by load path analysis. Less or no material may be located within regions outside load paths. As such, the two-dimensional profile can be considered load-path approximated.

In optional step 66, it is reviewed whether or not the two-dimensional profile is constant across the thickness of a planar body. If there are variations of the two-dimensional profile across the thickness, such variations may be removed. In optional step 66, it may also be reviewed if the profile can be manufactured with a given slice thickness.

In optional step 68, it is reviewed whether or not the two-dimensional profile is unitary, so that it can be manufactured as a single cohesive component. If there are separate regions or regions at risk of failing to maintain a unitary design, such as beams that are too thin, such regions may be altered to provide a more stable structure.

In optional step 70, an iteration of defining the two-dimensional profile may be carried out. The method may repeat step 64, and any one of steps 66 and 68, and may also take into account results from steps 66 and 68 to redefine preserve regions or to redefine functional regions.

During steps 64 to 70, an iteration of the two-dimensional profile may result in a profile that follows a load path pattern less precisely, for instance if this is required to maintain a unitary character of a profile or to maintain a minimum thickness of a beam.

After one or more executions of step 64 and any of steps 66 to 70, the ensuing two-dimensional profile provides a lower-mass load-path approximated structure when compared to an otherwise solid reference shape.

In step 72, a planar body is formed incorporating the two-dimensional profile. The planar body may be formed by stamping the two-dimensional profile from a sheet of material, such as sheet metal. A planar body stamped from a sheet material may be shaped to a non-planar body in step 78.

The planar body may be formed in optional steps 74 and 76. In optional step 74, the two-dimensional profile is incorporated as an axial block profile into an intermediate block. For instance, the two-dimensional profile may be used as an extrusion profile to manufacture an extrusion. If in step 74 an intermediate block was manufactured, then step 76 provides removing one or more slices from the intermediate block to provide the planar body. In step 76, one or more slices are axially separated from the intermediate block. It will be understood that each one of the separated slices has practically the same axial profile defined by the extrusion profile. A planar body obtained via steps 74 and 76 can be shaped to a non-planar body in step 78.

In step 78, the planar body is shaped by a forming operation to a non-planar shape. The forming operation may comprise bending or any other suitable forming operation.

In optional step 80, additional structures are incorporated by forming the non-planar article. Such additional structures may include, for instance, re-enforcing ribs, or features such as helping-hand clips.

In optional step 82, a finishing operation is carried out, such as de-burring, smoothing, polishing, coating, and/or other suitable finishing operations or combinations thereof. A finishing operation may be used to remove features associated with the separation process of steps 72 and/or 76 and/or with the shaping process of step 78. The steps may be carried out in a different order or simultaneously. For instance, the step 78 of forming the planar shape may be carried out at the same time as the step 80 of incorporating additional structures in a single forming operation. A finishing operation of step 82 may be carried out on the shaped article. A finishing operation of step 82 may be carried out on the planar body obtained in step 72 prior to step 78. A finishing operation may be carried out multiple times, e.g. before and after step 78.

Figure 10:
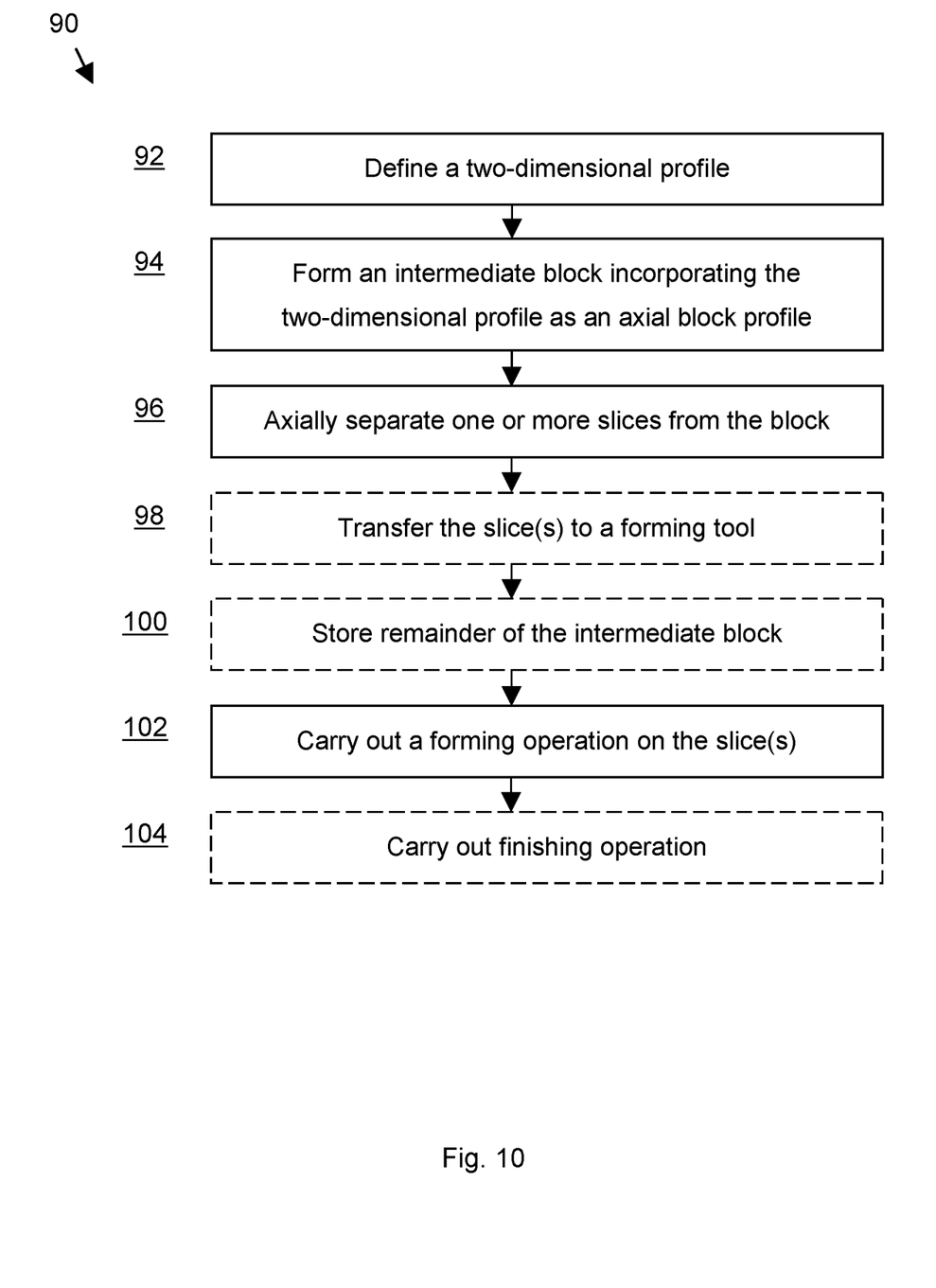
FIG. 10 shows a sequence of steps in accordance with another exemplary embodiment.

FIG. 10 describes a method 90 that may form part of the method 60. The method 90 comprises a step 92 of defining a two-dimensional profile. The step 92 may comprise any one or more of the steps 62 to 70 described in relation to the method 60 described in relation to FIG. 9.

In step 94, a physical block is created as an intermediate component incorporating the two-dimensional profile as an axial block profile. The intermediate component may be an extruded block such as described with reference to FIG. 3. The block may be manufactured using extrusion, pultrusion, cutting, or other suitable methods. The step 94 may be carried out as the step 74 of method 60.

In step 96, one or more slices are axially separated from the intermediate block. It will be understood that step 96 allows a large number of slices with identical, or for practical purposes identical, profile to be manufactured. The slices are understood to extend in a plane perpendicular to the block axis. A slice obtained in this manner constitutes a planar body. The step 96 may be carried out as the step 76 of method 60.

If an intermediate component is formed, one or more of the slices obtained may be transferred to a forming tool in step 98. As an alternative to step 98, a forming operation is carried out simultaneously with the slicing step, or immediately after a slice is separated from the block in step 86.

In optional step 100, a remainder of the block is stored. The method 90 allows a pre-determined number of slices to be separated from the intermediate block for manufacturing an article such as a bracket. The remainder of the block may be easier to handle than a large number of shaped articles. An addition, a given block profile may be suitable for the manufacture of different articles shaped from planar bodies with the same body profile, wherein the articles may differ in the way the planar body is shaped to a non-planar article, and/or wherein the articles may have a different slice thickness. A length of a pre-formed block may be stored for later manufacture of shaped articles such as angular brackets. It can be imagined that a number of differently profiled blocks may be stored for on-demand retrieval and manufacture of different bracket types.

In step 102, a forming operation is carried out on the slice. The forming operation allows manufacturing a shaped article with a profile that varies along the block axis, for instance a shape that would not be directly obtainable using extrusion. E.g., the shaped article may be a bracket comprising a profile variation along the extrusion axis. The step 102 may correspond to one or both of the steps 78 and 80 of the method 60.

In optional step 104, a finishing operation is carried out, and may include steps described in relation to step 82.

An article made according to method 60 or 90 may be identifiable by features such as edge burr suitable to indicate that a planar body was stamped from a sheet, or that a planar body was cut as a slice from an extruded block. The article may characteristically lack features usually associated with additive manufacturing, such as stepped layers, or moulding, such as de-moulding tapers or parting lines.

Figure 11:
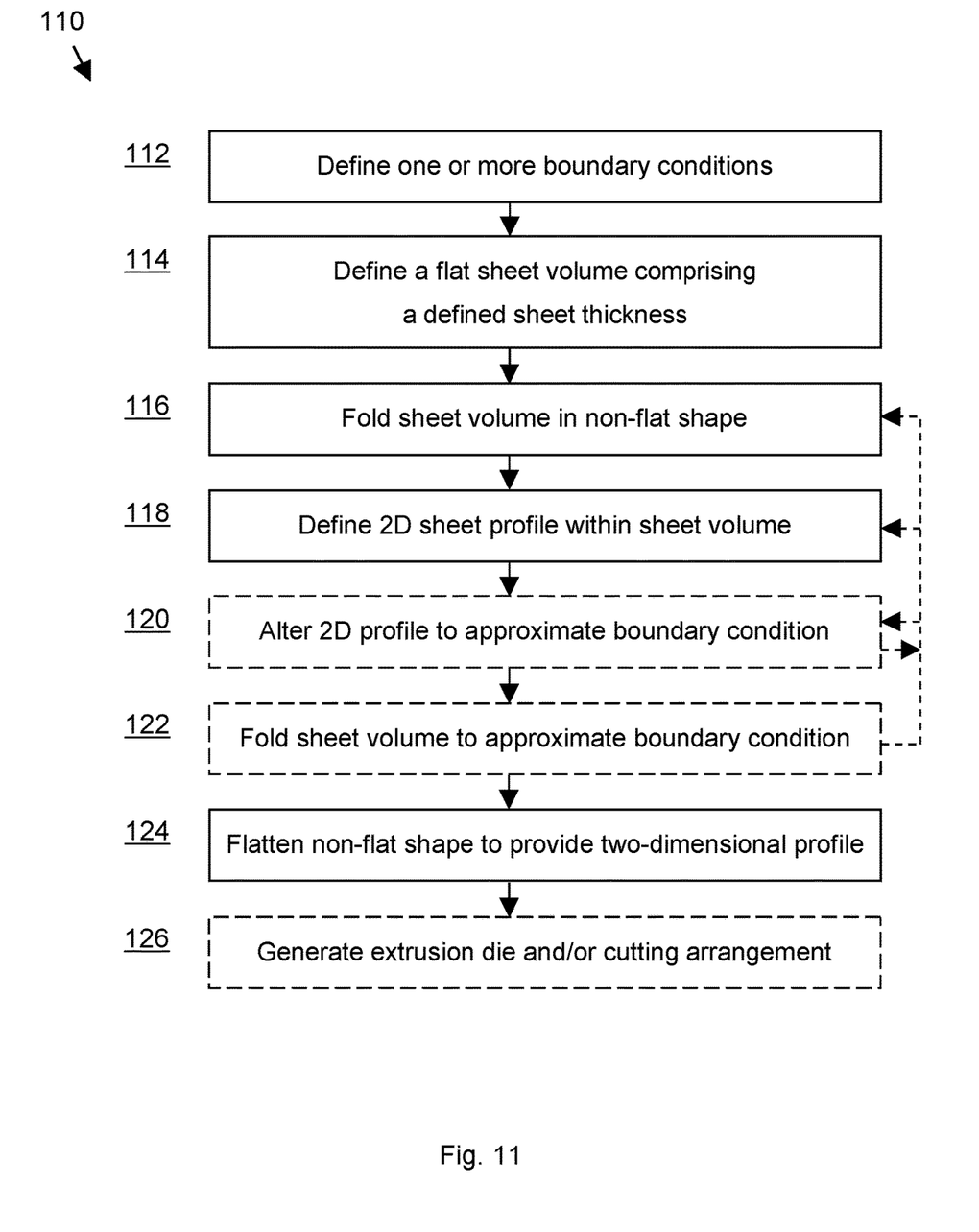
FIG. 11 shows a sequence of steps in accordance with another exemplary embodiment.

FIG. 11 describes a method 110 of defining a two-dimensional profile for use with a manufacturing method such as method 60 or method 90 described above. The method 110 may be carried out as part of step 64 or step 92.

In step 112, one or more boundary conditions of a design space are defined. The boundary conditions may comprise size features such as maximum and minimum dimensions of an article, e.g. length, height and width of a bracket. The boundary conditions may stipulate maximum and/or minimum mass. The boundary conditions may comprise location, number, shape and size of functional regions such as mounting apertures for screws. The boundary conditions may comprise preserve requirements such as minimum and/or maximum feature sizes to remain suitable for manufacture by extrusion or stampings. Such preserve requirements may be a web thickness, web length, web curvature, and others.

In step 114, a sheet volume is defined having a defined sheet thickness. The sheet thickness may be chosen to correspond to a sheet metal thickness of a bracket to be manufactured.

In step 116, the sheet volume is re-shaped within the design space into a not-flat shape, e.g. by bending a portion of the sheet out of the sheet plane, for instance to obtain an angled bracket, e.g. with an L-profile shape. Step 116 may be carried out simultaneously with step 112 and/or step 114.

In step 118, a two-dimensional sheet profile is defined within the sheet volume. When step 118 is carried out, the sheet volume may no longer be planar because it was allowed to be reshaped in step 116. However, it will be understood that, throughout the thickness of the sheet profile, the profile is constant. Step 118 may incorporate some or all elements of steps 62 to 70 described with reference to FIG. 9.

In optional step 120, the sheet profile is changed in order to approximate the boundary condition. For instance, in step 120 the number and geometry of webs and openings may be altered to improve performance under a predefined load parameter. In optional step 122, the sheet volume is re-shaped to approximate the boundary condition. For instance, in step 122 the length of a bracket arm relative to a bracket stem may be altered. As another example, the curvature of a bend of a bracket may be altered in step 122. The step 120 and/or the step 122 may be repeated iteratively to approximate the boundary condition. The steps 120 and 122 may be carried out simultaneously or and/or successively.

In step 124, the sheet volume is flattened into a plane by reversing the re-shaping carried out in step 116 and in optional step 122. For instance, the flattening step may involve transforming the sheet profile into a plane by bending a bracket arm back into the plane of the bracket stem. During the flatting step, the sheet profile is transformed into a profile extending in two dimensions. The profile can be used, as a two-dimensional profile, to define a manufacturing tool or to define an axially extending profile of a block.

By 'two-dimensional' it is meant that a pattern or profile varies in two dimensions of a plane and is constant in a third dimension perpendicular to the plane. The two-dimensional profile may be incorporated into a sheet profile as an axial profile of any length, or thickness.

In optional step 126, a manufacturing component is generated on the basis of the two-dimensional profile. The manufacturing component may be an extrusion die shaped to allow extrusion of a block comprising the two-dimensional profile. The manufacturing component may be a cutting arrangement such as a die and/or a set of instructions set suitable to control a cutting tool.

The instructions may be provided in the form of software instructions. The cutting arrangement may comprise a processor implementing the software instructions.

It will be understood that a reference to a bracket herein is intended as an example of a shaped article manufactured from a planar body. The manufacturing method described herein may be used to manufacture other articles, such as medical implants, safety devices, scaffolds, support structures for temporary installations, packaging and containers, vehicle components and frames, speaker grilles, robotics components, sports gear, exercise gear, cycling components and frames, protective gear and harnesses, and/or furniture, as well as components of any of the aforementioned articles.

As indicated in FIG. 4, a planar body incorporating a two-dimensional profile may be suitable for forming one of a plurality of different articles, depending on the post-slicing shaping pattern. For instance, a two-dimensional profile of a bracket-precursor slice may incorporate three possible bend lines A, B and C. By bending bend lines A and B each 45 degrees, the bracket precursor slice may be formed into an L-shaped bracket.

By bending bend lines B and C each 90 degrees, the bracket precursor slice may be formed into a U-shaped bracket. As such, the same profile may be used to manufacture multiple bracket types. This allows prefabricating a small number of extruded profiles as intermediate component, or precursor, for subsequent manufacture of articles by separating slices and forming them.

It is understood that the profile depicted in FIGS. 2 to 8 is exemplary. According to the invention the two-dimensional profile may have any shape, although it is possible that load-path analyses based on similar parameters may yield similar and perhaps near-identical two-dimensional profiles.

The invention is thought to be useful particularly in the manufacture of load support brackets, such as mounting brackets or grid support brackets for wall and/or roof cladding and twin skin installations and the like. Such installations cover significant areas and require a large number of support brackets, such that the introduction of a lower-mass bracket reduces the overall load on underlying structures, as well as facilitating logistics, on-site handling and pre-installation of a large number of brackets.

The invention claimed is:

1. A sheet material load-support mounting bracket for at least one of wall cladding, roof cladding, grid support, and twin skin installations, the mounting bracket comprising functional regions comprising a first functional region providing a head end and a second functional region providing a foot end, and a network of beams between the first functional region and the second functional region, the mounting bracket comprising a non-planar structure formed from a planar body of sheet material from which has been bent at least one portion out of a plane of the planar body to provide an angled bracket comprising the head end and the foot end, wherein the mounting bracket comprises a load-path approximated lower-mass structure comprising material along at least one of load-bearing paths and stress-exposed paths, in the form of a network provided by an irregular two-dimensional lattice of beams, wherein the lower-mass structure comprises apertures of irregular shape corresponding to said low-stress regions, as a two-dimensional profile extending across the thickness of, and perpendicularly to, a plane of the planar body.

2. The mounting bracket according to claim 1 comprising at least one portion bent from the planar body to provide at least one further unctional region.

3. The mounting bracket according to claim 1, wherein the non-planar structure is a unitary body.

4. The mounting bracket according to claim 3, wherein the at least one portion bent from the planar body provides a helping hand clip.

5. The mounting bracket according to claim 1, wherein at least one beam of the lower-mass structure comprises a tapering profile portion.

6. The mounting bracket according claim 1, wherein the lower-mass structure comprises at least one beam of varying cross-section along its length.

7. The mounting bracket according to claim 1, wherein the lower-mass structure comprises struts at non-orthogonal angles to each other.

8. The mounting bracket according to claim 1, comprising a helping-hand clip arrangement comprising at least one clip extending along and outside the plane of the planar body for provisional retention of an article to be provided.

9. The mounting bracket according to claim 8, wherein the plastic deformation within the planar extension comprises at least one of thinning, stretching, and compressing, of at least a part of the planar body within its planar extension.

10. The mounting bracket according to claim 1, wherein a cross-section of at least one portion of the planar body comprises a plastic deformation within its planar extension.

11. A method of manufacturing a load support mounting bracket comprising a non-planar structure formed from a planar body, the mounting bracket comprising at least one beam between functional regions for mounting an article to be provided via said mounting bracket to another article or surface to be provided, the method comprising;
    defining a two-dimensional profile comprising a load-path approximated lower-mass structure derived from an analysis of load paths or stress distribution between the functional regions to establish low-stress regions by computational means,
    wherein the two-dimensional profile comprises material along at least one of load-bearing paths and stress-exposed paths in the form of a network of beams, and apertures of irregular shape corresponding to said low-stress regions established by computational means,
    providing a planar body of sheet material,
    incorporating the two-dimensional profile as a body profile that extends across a thickness of, and perendicularly to, a plane of the planar body, and
    carrying out a forming operation on the planar body to form a non-planar structure by bending at least one portion out of a plane of the planar body.

12. The method according to claim 11, comprising:
    separating material from the sheet to thereby incorporate the two-dimensional profile as a body profile.

13. The method according to claim 12, wherein separating material from the sheet comprises at least one of stamping, cutting, and laser-cutting.

14. The method according to claim 11, wherein the forming operation comprises at least one of bending and a die-forming operation.

15. The method according to claim 11, wherein the plastic deformation within the planar extension comprises at least one of thinning, stretching, and compressing, of at least a part of the planar body within its planar extension.

16. The method according to claim 11, wherein the forming operation comprises plastically deforming a cross-section of at least one portion of the planar body within its planar extension.

17. The method according to claim 11, comprising forming at least one of wings, corrugations and ribs.

18. The method according to claim 11, comprising forming a helping-hand clip arrangement.

19. A method of defining a two-dimensional profile for forming a load support mounting bracket according to claim 1, the mounting bracket comprising at least one beam between functional regions for mounting an article to be provided via said mounting bracket to another article or surface to be provided, the method comprising:
    defining a design space comprising at least one boundary condition,
    defining a sheet volume having a sheet thickness and at least one functional region,
    within the design space, forming the sheet volume into a non-flat shape by bending portions of the sheet volume,
    defining a two-dimensional sheet profile within the sheet volume based on the at least one boundary condition and the at least one functional region, wherein the two-dimensional sheet profile comprises material in the form of a network of beams along at least one of load-bearing paths and stress-exposed paths derived from an analysis by computational means of at least one of load paths and stress distribution between the functional regions, and wherein the two-dimensional profile incorporates apertures of irregular shape corresponding to said low-stress regions, established by computational means, and
    flattening the non-flat shape to a planar sheet, to provide a two-dimensional profile that is constant across the sheet thickness.

20. The method according to claim 19, wherein forming the sheet volume into a non-flat shape comprises plastically deforming by at least one of bending, folding, die-forming, and/or bending.

21. The method according to claim 19, comprising defining an extrusion arrangement for manufacturing a block incorporating the two-dimensional profile as an axial block profile.

22. The method according to claim 19, comprising defining a set of instructions for controlling a cutting arrangement for manufacturing a planar body incorporating the two-dimensional profile.

23. The method according to claim 19, wherein the lower-mass structure extends across multiple planes of the non-planar structure.

24. The method according to claim 19, wherein the plastic deformation within the planar extension comprises at least one of thinning, stretching, and compressing, of at least a part of the planar body within its planar extension.

\* \* \* \* \*

UNITED STATES PATENT AND TRADEMARK OFFICE
CERTIFICATE OF CORRECTION

| | |
|---|---|
| PATENT NO. | : 12,392,124 B2 |
| APPLICATION NO. | : 17/914860 |
| DATED | : August 19, 2025 |
| INVENTOR(S) | : Laura Helena Evans et al. |

It is certified that error appears in the above-identified patent and that said Letters Patent is hereby corrected as shown below:

In the Specification

In Column 4, Line 35, delete "method," and insert -- method --.

In Column 7, Lines 31-32, delete "Voids between the structures may be of complex, higher-order shapes." and insert the same on Column 7, Line 30, as a continuation of the same paragraph.

In Column 8, Line 34, delete "arrangement," and insert -- arrangement --.

In Column 8, Line 40, delete "arrangement," and insert -- arrangement --.

In the Claims

In Column 17, Line 19, in Claim 2, delete "unctional" and insert -- functional --.

In Column 17, Lines 22-24, in Claim 4, delete "claim 3, wherein the at least one portion bent from the planar body provides a helping hand clip." and insert -- claim 1, wherein the lower-mass structure extends across multiple planes of the non-planar structure. --.

In Column 17, Line 43, in Claim 10, delete "cross- section" and insert -- cross-section --.

In Column 17, Lines 63-64, in Claim 11, delete "perendicularly" and insert -- perpendicularly --.

In Column 18, Line 55, in Claim 20, delete "and/or" and insert -- and --.

In Column 18, Lines 65-67, in Claim 23, delete "wherein the lower-mass structure extends across multiple planes of the non-planar structure." and insert -- wherein the at least one portion bent from the planar body provides a helping hand clip. --.

Signed and Sealed this
Seventh Day of October, 2025

John A. Squires
*Director of the United States Patent and Trademark Office*